Figure 2A:
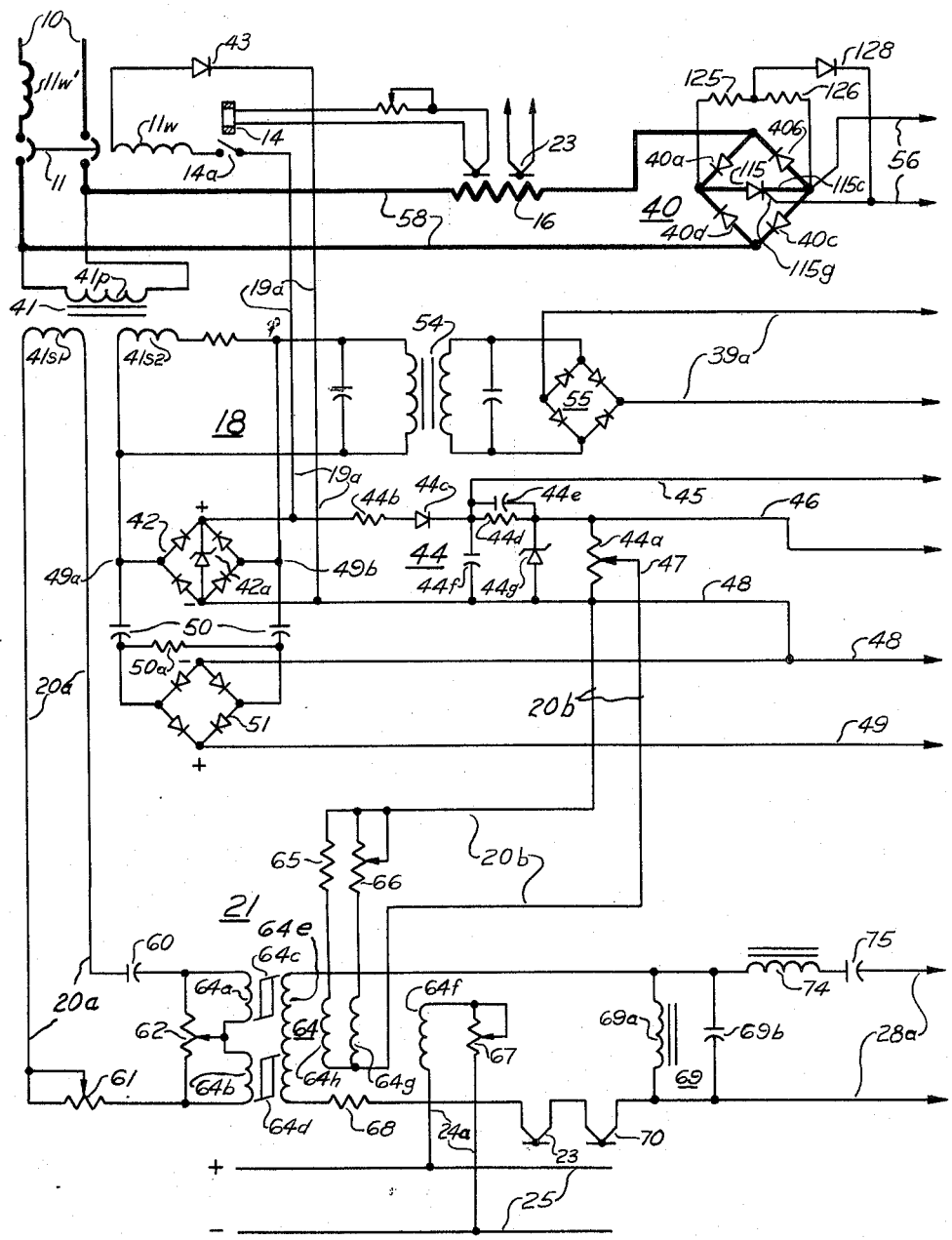

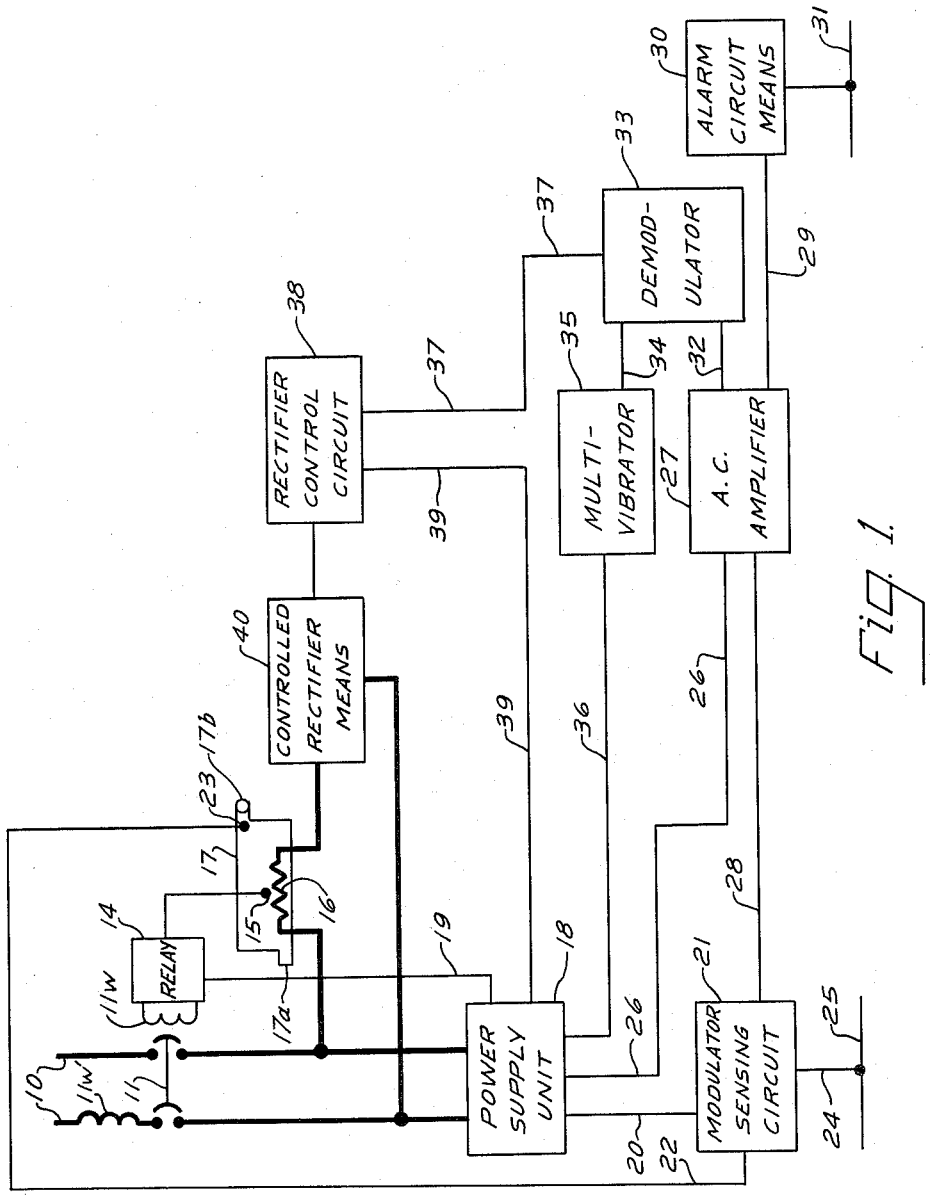

INVENTORS.
TERRENCE E. DE VINEY
LEE J. PENKOWSKI
BY
*Their* ATTORNEY.

United States Patent Office 3,231,719
Patented Jan. 25, 1966

3,231,719
HEATER CONTROL SYSTEM
Terrence E. De Viney, Seven Hills, Ohio, and Lee J. Penkowski, St. Petersburg, Fla., assignors to Square D Company, Park Ridge, Ill., a corporation of Michigan
Filed Aug. 16, 1963, Ser. No. 302,602
8 Claims. (Cl. 219—497)

This invention relates to the control of heaters, and more particularly to an electrical control system for maintaining air at a predetermined temperature as it is discharged from an enclosure in which it is heated by an electrical resistor.

Prior systems for controlling electrical resistance heaters in response to variance in the temperature of air heated by the resistor do not respond quickly enough for certain applications. For example, when the discharge flow rate of heated air is extremely rapid, it has been found that existing control systems are incapable of responding quickly and accurately enough to maintain the temperature of the air within one percent of a desired temperature.

To provide this preciseness of temperature control and, at the same time, the necessary rapid response to temperature variations, the improvements of the present invention must incorporate the overall control system so that the desired accuracy and speed of response is obtained.

In a control system according to this invention, power for the heating resistor is supplied from an alternating current soucre. To control the power and thereby to change the amount of heat delivered by the heating resistor, a feedback voltage signal, derived from a thermocouple responsive to the temperature of the air at the discharge point of the heater, is compared with a reference voltage signal which is adjustable to preselect the desired air temperature. The reference voltage signal preferably is derived from an adjustable voltage source arranged so that a plurality of heater control systems can be made responsive to a single adjustment of the reference voltage. The feedback and reference signals are introduced into a modulator-sensing circuit which provides an alternating output voltage signal having an amplitude proportional to the difference in magnitude of the two input signals and displaced in phase either 0° or 180° with respect to an independently-generated pulsating voltage signal. Which of the two phase displacements occurs is dependent upon which one of the feedback and reference signals is the larger. The alternating output signal is amplified and supplied to a demodulator and, if desired, to an alarm circuit means.

The demodulator compares the amplified alternating output signal with the output of a multivibrator which supplies the independently-generated pulsating signal. The demodulator output signal is a unidirectional voltage having a magnitude proportional to the difference in magnitude of the reference and feedback signals and having a polarity dependent upon which of the two is the larger. The unidirectional signal from the demodulator is supplied to a control circuit for a controlled rectifier which, in turn, controls the amount of alternating current supplied to the heating resistor.

The system may, if desired, include a minimum and maximum heating adjustment means. In addition, a means for transferring control to a separate manual adjustment means not responsive to a feedback signal may be provided.

In an auxiliary circuit provided to prevent overheating and consequent damage of the heating resistor, a thermocouple responsive to the temperature of the heating resistor controls a sensitive relay. If the temperature of the heating resistor exceeds a preselected value, the relay contacts close to energize a shunt trip coil of a circuit breaker thereby opening the circuit breaker and removing power from the system.

It is an object of this invention to provide an improved control system for maintaining air at a predetermined temperature as it is discharged from an enclosure in which it is heated by an electrical resistor.

Another object is to provide a control system for an electrical air heater which includes a second harmonic magnetic modulator for comparing feedback and reference voltage signals.

Another object is to provide a control system for an electrical air heater in which the output of a magnetic modulator for comparing feedback and reference voltages is demodulated by a ringe demodulator.

Another object is to provide a control system for heating air prior to its discharge from an enclosure in which a single adjustment of a reference signal source controls the temperature of the air discharged from several heaters.

Another object is to provide an air heater control system in which an improved alarm circuit means gives an alarm whenever the temperature of the air being discharged from the heater is outside a predetermined range.

Another object is to provide an air heater control system including an improved auxiliary means for selecting the maximum power input to the heater.

Another object is to provide an air heater control system including an improved auxiliary means for selecting the minimum power input to the heater.

Another object is to provide an air heater control system which uses solid-state or static components throughout the main control circuitry.

Another object is to provide an air heater control system including improved means for maintaining the power input to a heater at a reduced level upon a reduction in the rate of air flow through the heater below a predetermined safe value.

Figure 2B:
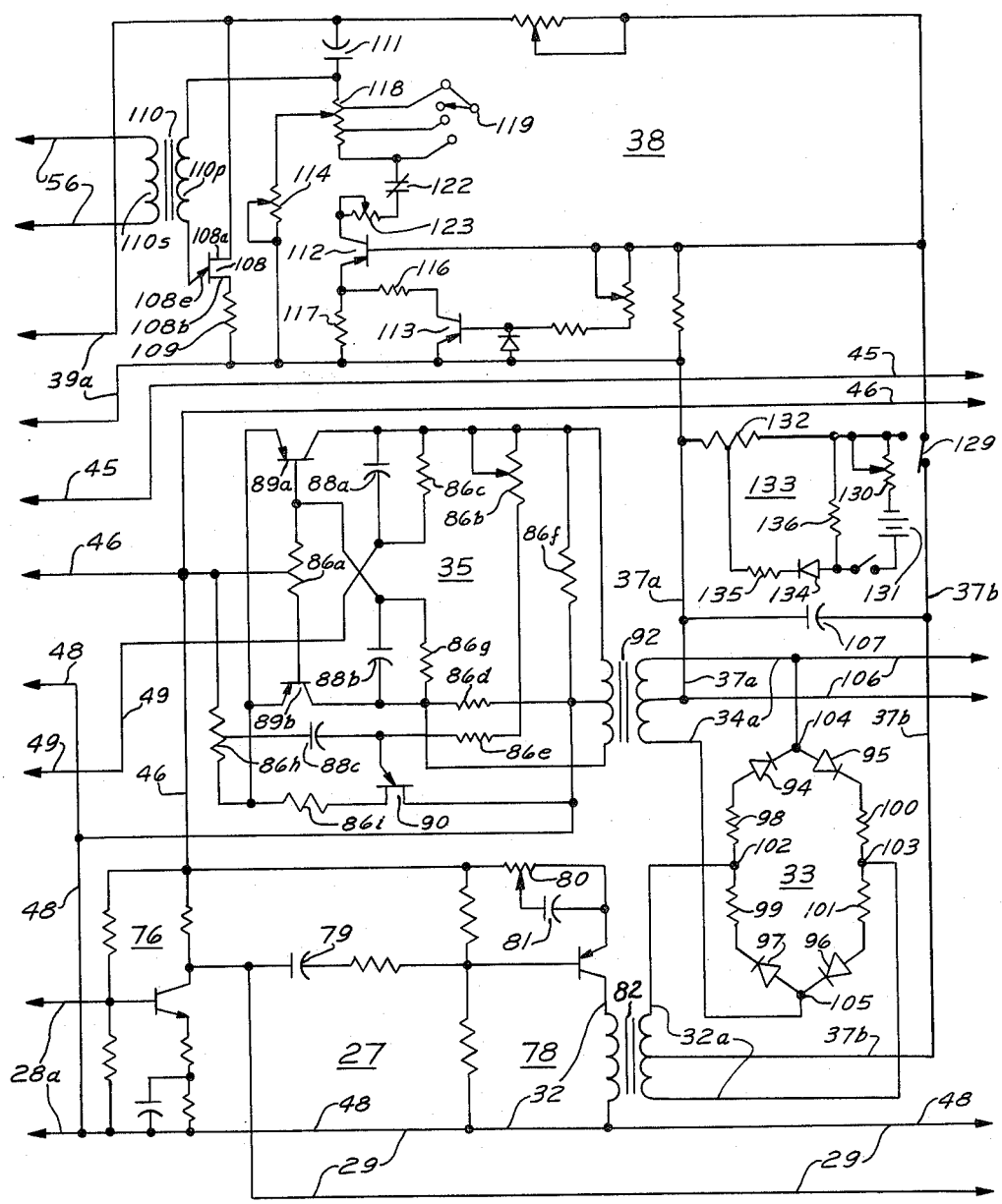
Figure 2C:
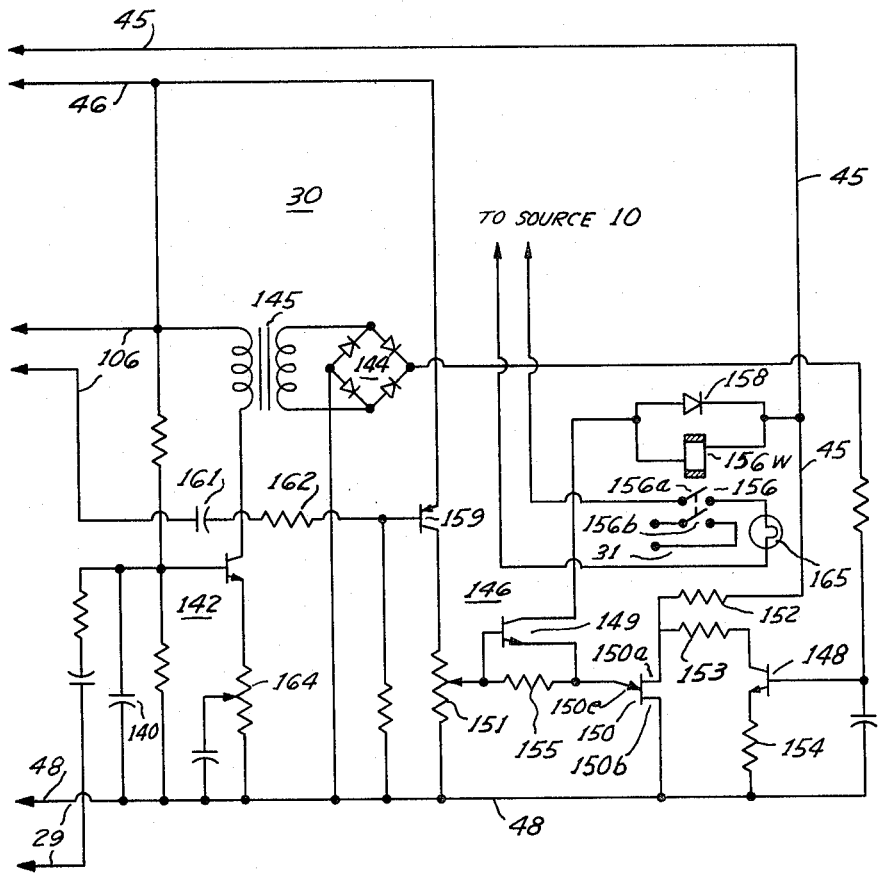

FIGURE 1 is a block diagram of an air heater control system in accordance with this invention; and FIGURES 2A, 2B, and 2C constitute a complete elementary wiring diagram of the air heater control system of FIGURE 1.

Referring first to the block diagram of FIGURE 1, power is supplied to the control system from a suitable source 10 of alternating current of central station frequency, usually sixty cycles per second, through a double-pole circuit breaker 11 having a shunt trip coil 11w controlled by a sensitive relay 14 responsive to a thermocouple 15 positioned adjacent a heating resistor 16 to be controlled by the system. The circuit breaker 11 may also have a series trip coil 11w'. Preferably, the relay 14, which may be a meter-type relay, has an adjustable pick-up value so that the temperature of the resistor 16 that will cause the circuit breaker 11 to open can be preselected. The heating resistor 16, which may be a bank of electrically interconnected resistance units, is mounted within an enclosure 17 having an air inlet 17a and an air outlet 17b, it being understood that air is forced through the enclosure 17 by a blower or other means, not shown.

Power from the source 10 is supplied to a power supply unit 18 which provides both alternating current and direct current at suitable voltages to other components of the control system. A direct current output 19 of the power supply unit 18 provides operating power for the shunt coil 11w of the circuit breaker 11 through the relay 14. An alternating current output 20 of the power supply unit 18 supplies a frequency-doubling modulator or sensing circuit 21. The modulator-sensing circuit 21 is controlled by a temperature-related feedback signal 22 from an air temperature thermocouple 23 and by a reference signal 24 from a reference signal source 25. The thermocouple 23 is positioned to be responsive to the temperature of the air at the air outlet 17. The power supply unit 18 also supplies power through an output 26 to an alternating current amplifier 27 which amplifies an alternating error signal 28 received from the modulator-sensing circuit 21. The alternating signal 28 is dependent upon the relative magnitudes of the signals 22 and 24. One output 29 of the amplifier 27 may supply an alarm circuit means 30 which is connected to an alarm bus 31 to provide an indication when the temperature of the air being discharged deviates from a predetermined temperature range. Another output 32 of the amplifier 27 is supplied to a demodulator 33 which receives a double-frequency pulsating signal 34 from an astable multivibrator 35. The multivibrator 35 is energized through an output 36 of the power supply unit 18.

A unidirectional voltage having a polarity and magnitude dependent upon the relative magnitudes of the signals 22 and 24 is supplied by an output 37 of the demodulator 33 to a rectifier control circuit 38 which derives its power through an output 39 of the power supply unit 18. The rectifier control circuit 38 responds to the unidirectional voltage supplied by the output 37 of the demodulator 33 to control the firing angle and, hence, the magnitude of the alternating current output of a controlled rectifier means 40. The rectifier means 40 is interposed in a power supply circuit for the heating resistor 16 and, thus, the firing angle of the rectifier means 40 controls the current in the resistor 16.

Referring now to FIGURES 2A, 2B, and 2C, the power supply unit 18 comprises a transformer 41 having a pair of secondary windings 41s1 and 41s2 and having a primary winding 41p supplied through the circuit breaker 11 from the source 10. The secondary winding 41s1 supplies alternating current at a reduced voltage to the modulator-sensing circuit 21 through a pair of conductors 20a, indicated generally in FIGURE 1 by the output 20. The secondary winding 41s2 supplies power at a reduced voltage to a rectifier bridge 42. A zener diode 42a, connected across the output terminals of the rectifier bridge 42, limits the magnitude of the voltage which appears at the terminals of the rectifier bridge 42, as will later be explained. The rectifier bridge 42 supplies a unidirectional voltage to the coil 11w through a pair of conductors 19a of the output 19, a normally open contact 14a of the relay 14, and a blocking rectifier 43. The rectifier bridge 42 also supplies unidirectional voltage through a zener-regulated filter and potentiometer combination 44 to provide power at a first pair of busses 45 and 48 and at a second pair of busses 46 and 48 at selected fixed positive voltages, respectively, and at a third pair of busses 47 and 48 at an adjustable positive voltage taken from a potentiometer 44a. The bus 48 is common to each of the three pairs of busses. The combination 44, in addition to the potentiometer 44a, comprises a resistor 44b, a diode 44c, a resistor 44d, capacitors 44e and 44f, and a zener diode 44g. The resistor 44b, the diode 44c, the resistor 44d, and the potentiometer 44a are connected in series with each other across the rectifier bridge 42. The capacitor 44e is in parallel with the resistor 44d and the zener diode 44g is in parallel with the potentiometer 44a. The capacitor 44f is in parallel with the series connected resistor 44d and the potentiometer 44a. The zener voltage of the zener diode 44g is lower than that of the zener diode 42a and thus the combination 44 provides a substantially constant voltage output regardless of load. The capacitors 44e and 44f filter the voltage from the rectifier bridge 42 so that the output of the combination 44 has substantially no ripple.

The busses 46 and 48 constitute the output 26 (FIGURE 1) leading to the alternating current amplifier 27. The busses 45, 46, and 48 supply power to the alarm circuit means 30. The busses 47 and 48 also supply a pair of conductors 20b of the output 20 to provide direct current to the modulator-sensing circuit 21 for biasing purposes.

The clipping action of zener diode 42a in combination with the diodes of the bridge 42 also causes a clipped alternating voltage to be supplied from the secondary winding 41s2 to a pair of terminals 49a and 49b.

The voltage at the terminals 49a and 49b in modified by a pair of capacitors 50 and supplied across a resistor 50a to a rectifier bridge 51 so that the output of the rectifier bridge 51 is a series of unidirectional pulses, occurring twice during each cycle of alternating current from the secondary winding 41s2.

The output of the rectifier bridge 51 is supplied through the bus 48 and a bus 49 as a synchronizing signal to the multivibrator 35. The busses 46 and 48 supply power to the multivibrator 35. Thus, the busses 46, 48 and 49 comprise the output 36 of FIGURE 1. The multivibrator 35 has a square voltage wave output of twice the frequency of the supply source 10. Any suitable frequency-doubling multivibrator may be used to obtain a double-frequency voltage. The one disclosed is described in detail later.

The clipping action of zener diode 42a in the rectifier bridge 42 causes a clipped alternating voltage to be supplied from the secondary 41s2 to a transformer 54 feeding a rectifier bridge 55. Unidirectional clipped pulses from the rectifier bridge 55 are supplied to the rectifier control circuit 38 (FIG. 2B) through a pair of conductors 39a constituting the output 39 of FIGURE 1. A pair of conductors 56 connects the rectifier control circuit 38 to the controlled rectifier means 40 which is interposed in a power circuit comprising conductors 58 and extending from the load side of the circuit breaker 11 to supply alternating current to the heating resistor 16 at a controlled average value depending upon the conductivity of the rectifier means 40.

The modulator-sensing circuit 21 is a second-harmonic magnetic modulator and comprises a phase-correcting capacitor 60, an adjustable resistor 61, a potentiometer resistor 62, a saturable magnetic device 64, a negative temperature coefficient resistor 65, additional adjustable resistors 66 and 67, a negative temperature coefficient resistor 68, and a parallel-resonant circuit 69. The thermocouple 23 which is responsive to the temperature of the heated air is connected in a series loop circuit with the negative temperature coefficient resistor 68, a reference or cold-junction thermocouple 70, a feedback winding 64e to be later described, and the resonant circuit 69. The thermocouple 23 is shown at a convenient location in the wiring diagram and is also shown adjacent the resistor 16 to indicate its physical position.

The saturable magnetic device 64 includes a pair of input windings 64a and 64b wound in opposition on respective cores 64c and 64d. Saturation of the cores 64c and 64d is effected by the input windings 64a and 64b. The feedback winding 64e and a reference winding 64f, each common to the two cores 64c and 64d, control the symmetry of saturation of the cores. Flux provided by bias windings 64g and 64h assists in balancing the voltages induced by the windings 64a and 64b and compensates for variations in the feedback signal due to the effects of the thermocouple 70. The potentiometer 62 which is connected across the input windings 64a and 64b has an intermediate tap connected between the input windings 64a and 64b to provide for balancing of the voltages at those windings.

The modulator-sensing circuit 21 receives an alternating current input for the input windings 64a and 64b through the conductors 20a and a direct current input for the bias windings 64g and 64h through the conductors 20b. The reference signal 24 of FIGURE 1 is supplied by conductors 24a to the reference windings 64f through the adjustable resistor 67. The signal 24 is derived from the reference source 25 shown as a D.-C. bus which may be used to supply a reference signal to additional heater control systems not shown.

The alternating current supplied to the sensing circuit 21 through the conductors 20a drives the cores 64c and 64d into saturation every half cycle. With no voltage impressed across the feedback winding 64e or reference winding 64f, the voltage induced in the winding 64e by each of the input windings 64a and 64b is a pulse at the beginning of each half cycle of the source 10. These pulses are symmetrical and thus contain only odd harmonics. Because the two voltages induced in the winding 64e are equal and opposite, the net voltage across the winding 64e is zero under these conditions. When a voltage from the thermocouple 23 is impressed across the feedback winding 64e, one of the cores 64c or 64d becomes saturated earlier in the half-cycle of one polarity; concurrently, the saturation of the other core is delayed. The opposite effect occurs on the succeeding half cycle of opposite polarity. This destroys the symmetry of the alternating voltages induced in the feedback winding 64e by the input windings 64a and 64b. Because the symmetry has been destroyed, the voltage induced in the winding 64e contains both even and odd harmonics. The even harmonics are additive, and the odd harmonics are subtractive so that the winding 64e now includes even harmonics and substantially no odd harmonics. The magnitude and the phase displacement with respect to the fundamentals of the even harmonics are determined by the magnitude and polarity, respectively, of the voltage impressed on the feedback winding 64e. For example, if the feedback voltage across the feedback winding 64e is reversed, the second and other even harmonic voltages will be displaced in phase by 180°.

The reference winding 64f receives a reference voltage from the source 25 which, in the absence of a feedback voltage, would provide an even harmonic output from the circuit 21 having a phase displacement determined by the polarity of the reference voltage. The reference voltage impressed on the reference winding 64f is normally in a direction to oppose the effect of the feedback winding 64e. When the effect of the feedback signal at the winding 64e is equal to the effect of the reference signal at the winding 64f, the even harmonic output is zero. If the effect of the reference voltage exceeds the effect of the feedback voltage, the even harmonics are in phase with the voltage signal generated by the multivibrator 35. When the feedback voltage exceeds the reference voltage, the even harmonics are displaced in phase by 180° with respect to the voltage signal generated by the multivibrator 35 thereby indicating that the feedback voltage is larger than the reference voltage.

The voltage containing principally even harmonics induced in the winding 64e is impressed across the resonant circuit 69 which comprises an inductor 69a and a capacitor 69b connected in parallel and tuned to the frequency of the second harmonic. The resonant circuit 69 thus provides a high impedance to the second harmonic and a low impedance to all other harmonics as well as the fundamental. Accordingly, the output of the modulator-sensing circuit 21 is an alternating current signal of double the source frequency and having an amplitude proportional to the difference of the feedback and reference input signals and a phase displacement of 0° or 180° with respect to the signal generated independently by the multivibrator 35 dependent upon which of the two input signals is the larger.

The modulator-sensing circuit 21 thus provides an alternating current output dependent upon the magnitude of relatively small direct current inputs. The alternating current output is desirable because direct current amplifiers are particularly unstable with temperature and are subject to "drift," thereby being practically impossible to stabilize. The modulator-sensing circuit 21, as well as the alternating current amplifier 27, can be made very stable with temperature. In the case of the modulator-sensing circuit 21, the inherent symmetry of the magnetic core material eliminates all temperature considerations except those resulting from changes in the resistance of the windings and from variations in feedback signal caused by the reference thermocouple 70, temperature compensation for which is provided by the negative temperature coefficient resistor 68 connected in series with the feedback thermocouple 23 and by the bias circuit including the windings 64g and 64h. Alternating current amplifiers are easily compensated for such temperature variations that might ordinarily occur.

The output of the modulator-sensing circuit 21 which appears across the parallel resonant circuit 69 is introduced into the A.-C. amplifier 27 through a pair of conductors 28a, indicated generally in FIGURE 1 by the signal 28. A series filter comprising an inductor 74 and a capacitor 75 tuned to the frequency of the second harmonic is interposed in one of the conductors 28a. The capacitor 75 also prevents any unidirectional voltages from being fed back into the circuit 21. Although any temperature-compensated alternating-current amplifier of suitable capacity would be satisfactory, the amplifier 27 as shown comprises two stages of amplification provided by transistor stages 76 and 78 power for which is supplied from busses 46 and 48. The transistor stages 76 and 78 are capacitively coupled to each other by a capacitor 79. The gain of the transistor stage 78 is selected by adjustment of a potentiometer 80 thereby to vary the amount of negative feedback. This permits changing the gain of the amplifier to aid in stabilizing the system. A capacitor 81, connected in series with the adjustable tap of the potentiometer 80, furnishes a low impedance path to alternating current signals. Direct current cannot pass through the capacitor 81 and therefore must be conducted through the full resistance of the potentiometer 80. A change in D.-C. voltage across the full resistance of the potentiometer 80 due to "drift" effects a change in the bias current of the transistor stage 78 thereby minimizing the "drift." The amplifier 27 has the two outputs 29 and 32. The first output 29 extends directly from the transistor stage 76 to the alarm circuit means 30 to be described later, and the second output 32 is through a transformer 82 fed from the transistor stage 78. The output of the transformer 82 is introduced into the demodulator 33 as indicated at 32 in FIGURE 1.

The multivibrator 35 illustrated comprises a network including a plurality of resistors 86a through 86i, capacitors 88a, 88b and 88c, two transistors 89a and 89b, and a unijunction transistor 90. This network controls the direct current power supplied thereto from the busses 46 and 48 thereby to provide the desired double-frequency square wave output of the proper magnitude at the primary of a transfer 92. The synchronizing signal supplied to the multivibrator 35 through theb usses 48 and 49 insures that the output of the multivibrator 35 is in proper phase sequence with respect to the signal 32 at the transformer 82. It therefore provides a reference source of alternating current having a fixed phase position relative to the source 10.

In order to use the information in the signal from the transformer 82 of the amplifier 27, some form of demodulator must be used. The ring demodulator 33, described in copending application Serial No. 863,021, now abandoned, filed on December 30, 1959 by Terrence E. DeViney for a Position Indicator, and assigned to the same assignee as this application, is suitable for this purpose. As shown, the demodulator 33 comprises diodes 94, 95, 96 and 97 serially connected in a ring or loop arrangement with resistors 98, 99, 100 and 101.

The rectifiers 94, 95, 96 and 97 are poled to pass current in the same direction around the loop or ring. The rectifiers 94 and 95 are next adjacent each other, and the rectifiers 96 and 97 are next adjacent each other in similar fashion. The resistors 98 and 99 are next adjacent each other and are interposed between the rectifiers 94 and 97; and, the resistors 100 and 101 are next adjacent each other and are interposed between the recetifiers 95 and 96. Two signals are necessary for the operation of the demodulator 33. The first signal is the signal 32 taken by a pair of conductors 32a from the terminals of the secondary winding of the transformer 82. The second is the signal 34 taken by a pair of conductors 34a from the terminals of the secondary winding of the transformer 92 of the multivibrator 35.

The signal in the conductors 32a is applied across a junction point 102, between the resistors 98 and 99, and a junction point 103 between the resistors 100 and 101. The signal in the conductors 34a is applied across a junction point 104, between the rectifiers 94 and 95, and a junction point 105, between the rectifiers 96 and 97. A conductor 37a from a mid-tap on the secondary winding of the transformer 92 and a conductor 37b from a mid-tap of the secondary winding of the transformer 82 carry the output signal 37 of the demodulator 33 which is impressed on the rectifier control circuit 38. An additional pair of conductors 106 leads from the transformer 92 to the alarm means 30 for a purpose later to be described.

A capacitor 107 is connected across the conductors 37a and 37b. When the voltage at the secondary of the transformer 82 of the amplifier 27 is zero, the voltage across the capacitor 107 is also zero. When a voltage appears at the transformer 82, the voltage across the capacitor 107 is a unidircetional voltage having a magnitude nd polarity determined, respectively, by the magnitude and by the phase relationship of the voltage at the transformer 82 with respect to the voltage at the transformer 92. Any harmonic voltages other than the second harmonic cannot appear as a unidirectional voltage across the capacitor 107 but instead appear there s n lternating voltage with no unidirectional component. Thus, the demodulator 33 and the multivibrator 35 combine to modify the alternating current signal from the amplifier 27 and provide a unidirectional signal having a magnitude proportional to the difference between the feedback signal 22 and the reference signal 24 and having a polarity dependent upon which of these two signals is the larger. The voltage across the capacitor 107 is used to control the firing of the rectifier control circuit 38 which controls the controlled rectifier means 40.

The rectifier control circuit 38 is preferably of a uni-junction transistor type well known in the art. It comprises a uni-junction transistor 108, a resistor 109, a pulse transformer 110, having primary and secondary windings 110p and 110s, respectively, a control capacitor 111, and a pair of transistors 112 and 113 together with associated resistors and diodes. The power for the rectifier control circuit 38 is obtained through the conductors 39a from the power supply unit 18 which output, as previously described, is a uni-directional clipped wave. Such a uni-junction type control circuit acts as a relaxation oscillator with the voltage supplied by the conductors 39a impressed across two bases 108a and 108b of the uni-junction transistor 108 through a resistor 109. This establishes the voltage at which the transistor 108 will fire from its emitter 108e to its base 108a. Neglecting, for purposes of explanation, the circuit through an adjustable resistor 114, the capacitor 111 charges through the transistor 112 at a rate determined by the magnitude of the signal 37 in the conductors 37a and 37b. When the voltage across the capacitor 111 reaches the firing potential of the emitter 108e to the base 108a of the uni-junction transistor 108, the transistor 108 fires, allowing the capacitor 111 to discharge rapidly, thereby to apply a voltage pulse to the primary 110p of the transformer 110. The consequent voltage pulse induced in the secondary 110s of the transformer 110 is transferred through the conductors 56 to a gate 115g and a cathode 115c of a silicon-controlled rectifier 115 forming part of the controlled rectifier means 40. If the current through the transistor 112 is increased, the voltage at the capacitor 111 reaches the firing level of the uni-junction transistor 108 in a shorter interval of time, resulting in more voltage pulses per second at the gate and cathode of the controlled rectifier 115. The output of the rectifier control circuit 38 is synchronized with the frequency of the source 10 by allowing the voltage between the bases 108a and 108b of the uni-junction transistor 108 to reach zero each half cycle. This allows the capacitor 111 to discharge fully thereby to reset the circuit.

The transistor 113 is included in the control circuit 38 to cause the circuit 38 to have an output which is linear with the input signal across the capacitor 107, i.e. the signal 37. The transistor 113 accomplishes this result by decreasing the negative feedback thereby to increase the gain for larger magnitudes of the incoming signal. For example, if the incoming signal 37 is such that the base of the transistor 113 is negative with respect to its emitter, the transistor 113 turns ON and permits current to flow through its emitter and collector in a circuit including a resistor 116. The circuit including the resistor 116 and the emitter and collector of the transistor 113, in parallel with a resistor 117, decreases the effective resistance in series with the transistor 112 thereby increasing the charging rate of the capacitor 111 to provide a voltage pulse earlier in each half cycle of the voltage applied across the controlled rectifier 115. This results in an increased current to the heating resistor 16. If the signal 37 is such that it drives the base of the transistor 113 positive with respect to its emitter, a decrease in the current through the transistor 112 results, slowing the charging rate of the capacitor 111 and making the transistor 108 fire later in each half cycle of the voltage applied across the rectifier 115. This results in a reduction in the current to the heating resistor 16.

If desired, a tapped resistor 118 may be provided to limit the maximum charging current through the capacitor 111 which, in turn, limits the maximum current that can be supplied to the heating resistor 16. A tap switch 119 having its contacts connected to taps along the resistor 118 enables a selection to be made of the maximum power that can be delivered to the heating resistor 16. The resistor 114 shunting the transistor 112 provides adjustment and control of the current through the capacitor 111 so that the minimum current which can flow to the heating resistor 16 can be selected. A normally-closed interlock switch 122 operable as by a vane (not shown) in the path of the air discharged from the heater is interposed in series with a resistor 123 between the transistor 112 and the resistor 118. In event the rate of air flow decreases below a predetermined value, the switch 122 opens transferring the control from the maximum power adjustment means comprising the resistor 118 and the tap switch 119 to the minimum power adjustment resistor 114.

The controlled rectifier means 40 (FIG. 2A) comprises, in addition to the controlled rectifier 115, rectifiers 40a, 40b, 40c, and 40d arranged to provide a circuit whereby the single controlled rectifier 115 can control both half waves of the alternating current in the conductors 58. Thus, the rectifier means 40 operates throughout a 360° swing of the phase angle of the input voltage which is possible with the resistive load shown. Thus, both half-waves of the alternating voltage at the heating resistor 16 are controlled by use of only one controlled rectifier 115. The rectifier means 40 may be protected by a pair of resistors 125 and 126 and a Shockley diode 128. Upon an undue voltage rise, the diode 128 breaks down causing the rectifier 115 to fire during that half cycle, reducing the voltage on the rectifiers of the rectifier means 40.

If a switch 129 (FIG. 2B) is moved from the position shown to its other position, control by the feedback and reference signals 22 and 24 is discontinued. Control of the air temperature is now under the control of a separate control means such as a rheostat 130 supplied from a separate source 131. The voltage developed across a resistor 132 of a resistor and diode network 133 including a diode 134 and resistors 135 and 136, is now impressed on the firing circuit 38. The network 133 provides the proper input resistance to the firing circuit 38.

Referring now to the alarm circuit means 30, the output signal 29 is taken from the amplifier 27 ahead of its adjustable stage 78 so that the signal 29 will always reflect the true amplitude of the error signal 28 supplied to the amplifier 27. The alarm circuit means 30 functions to determine when the temperature of the air being discharged at the air outlet 17b of the heater enclosure 17 is within a predetermined range. The signal 29, utilized as an incoming signal to the alarm circuit means 30, is filtered by a capacitor 140 to eliminate all undesirable harmonic voltages. An alternating current amplifier comprising a transistor stage 142 is used to increase the signal 29 to an operative level. The amplified signal from the stage 142 is rectified by a full-wave rectifier bridge 144 after passing through a transformer 145. The output of the rectifier bridge 144 is supplied to a transistorized network 146 containing transistors 148 and 149 and a uni-junction transistor 150.

The alarm circuit means 30 functions as a switching device with the main component being the uni-junction transistor 150. A voltage taken from the busses 45 and 48 is impressed across bases 150a and 150b of the uni-junction transistor 150. A voltage taken from a voltage divider 151 is applied to the emitter 150e of the transistor 150 and is selected so that it is below the firing potential of the transistor 150 when the voltage from the busses 45 and 48 is impressed across the bases 150a and 150b. When a signal is applied to the transistor 148 from the rectifier 144, a current flows from the collector to the emitter thereof through resistors 152, 153, and 154. This reduces the voltage between the bases 150a and 150b of the transistor 150 and, at a predetermined voltage level, the transistor 150 fires. The current flowing through the emitter to the base 150b of the transistor 150 passes through a resistor 155 turning on the transistor 149 which, in turn, causes energization of an electromagnetic relay 156 having an operating winding 156w. A diode 158 in parallel with the winding 156w provides a circuit to prevent the occurrence of high inductive voltages upon deenergization of the winding 156w.

A transistor 159 connected across the busses 46 and 48 is normally biased ON so that in the absence of other input signals to the transistor 159, the uni-junction transistor 150 continues to fire after once being fired, and the relay 156 remains energized. Close pick-up and drop-out of the relay 156 is obtained by turning the transistor 159 OFF in order to cause the transistor 150 to cease conduction. If the signal level input to the transistor 148 indicates a temperature within allowable preselected limits, the uni-junction transistor 150 does not fire and the relay 156 drops out and remains dropped out. If the signal across the transistor 148 is outside the preselected limits, the relay 156 remains energized. The pulsing signal to the transistor 159 is obtained from the multivibrator 35 through the circuit 106 which includes a capacitor 161 and a resistor 162.

The gain of the transistor stage 142 in the amplifier of the alarm circuit is adjusted by a potentiometer 164 to determine at what level of the error signal 28 the relay 156 will become energized. It should be noted that the error signal 28 may be of either phase displacement and that the alarm circuit is responsive to magnitude only.

The relay 156 has a normally open contact 156a in series with an indicating lamp 165 which may be supplied from the source 10. A separate contact 156b may also control the conductivity of the alarm bus 31.

It is thus seen that there has been provided a control system which is capable of maintaining the temperature of air being discharged rapidly from a heater within very close limits.

Having thus described our invention, we claim:

1. A control system for an electrical resistance heater comprising
    (a) feedback signal supply means adapted to be exposed to a temperature condition, and to be responsive to, and to provide a feedback signal to voltage related to, said temperature condition when so exposed,
    (b) reference signal supply means providing a reference signal voltage,
    (c) means adapted to be connected to an alternating voltage source and to become operative, when so connected, to provide a third signal voltage having a frequency different from that of said source,
    (d) alternating voltage generating means adapted for connection to said source and to become responsive, when connected to said source, to said feedback and reference signal voltages to provide an alternating voltage output signal having a frequency the same as the frequency of said third signal voltage and displaced in phase by either 0° or 180° from said third signal voltage, depending upon which voltage of the feedback and reference signal voltages is the larger, said alternating voltage output signal having a magnitude proportional to the difference in magnitudes of said feedback voltage and reference voltage,
    (e) alternating current amplifying means for amplifying said alternating voltage output signal,
    (f) demodulator means responsive to said third signal voltage and said alternating voltage output signal, as amplified, to provide a unidirectional signal voltage which is proportional to the difference in the magnitudes of the feedback voltage and reference voltage and which has a polarity depending upon which of the feedback or reference signal voltages is the larger, and
    (g) controlling means responsive to said unidirectional signal voltage for controlling said temperature condition.

2. A control system according to claim 1 wherein said means for providing a third signal voltage is a synchronized pulsating voltage signal means, and includes a multivibrator, and said pulsating voltage signal provided by the vibrator is synchronized with said source and is double the frequency of said source.

3. The structure according to claim 1 wherein a controlled air heating system comprising a hollow enclosure having an inlet and an outlet, and through which enclosure air to be heated can be circulated, is provided, an electrical resistance heater is disposed therein and is adapted for connection to said source, and said controlling means controls the power input to said heater from said source.

4. A control system according to claim 1 wherein said feedback signal supply means is a thermocouple responsive to said temperature condition.

5. A plurality of control systems, each according to claim 1, wherein said reference signal supply means of all of the systems are connected across a common adjustable reference voltage source.

6. A control system according to claim 3 wherein said controlling means includes controlled rectifier means for controlling said power input to said heater from said source, and rectifier control circuit means responsive to said unidirectional signal voltage from said demodulator means for controlling said controlled rectifier means.

7. A control system according to claim 6 wherein said controlled rectifier means includes a single controlled rectifier interposed in an alternating voltage power supply circuit for said heater and arranged to control the entire portion of the alternating cycles of said supply.

8. A control system in accordance with claim 6 wherein said rectifier control circuit means includes selector means for limiting the maximum current which can be supplied to said heater.

References Cited by the Examiner

UNITED STATES PATENTS

| | | | |
|---|---|---|---|
| 2,509,693 | 5/1950 | Morrison | 219—506 |
| 2,646,544 | 7/1953 | Sands | 219—499 |
| 2,944,137 | 7/1960 | Kaltenbach | 219—497 |
| 2,984,729 | 5/1961 | Hykes et al. | 219—501 |
| 2,994,759 | 8/1961 | Lipman | 219—501 |
| 3,040,157 | 6/1962 | Hukee | 219—501 |
| 3,097,314 | 7/1963 | Harriman | 219—501 |
| 3,109,910 | 11/1963 | Fogleman | 219—501 |

RICHARD M. WOOD, *Primary Examiner.*

ANTHONY BARTIS, *Examiner.*

UNITED STATES PATENT OFFICE

CERTIFICATE OF CORRECTION

Patent No. 3,231,719                      January 25, 1966

Terrence E. De Viney et al.

It is hereby certified that error appears in the above numbered patent requiring correction and that the said Letters Patent should read as corrected below.

Column 3, line 4, for "17" read -- 17b --; column 4, line 9, for "in" read -- is --; column 6, line 54, for "transfer" read -- transformer --; column 7, line 37, for "s n lternating" read -- as an alternating --; column 10, line 9, strike out "to", third occurrence.

Signed and sealed this 17th day of January 1967.

(SEAL)
Attest:

RNEST W. SWIDER                            EDWARD J. BRENNER
ttesting Officer                                Commissioner of Patents